United States Patent [19]

Rogers

[11] Patent Number: 4,538,373
[45] Date of Patent: Sep. 3, 1985

[54] FISHING LINE CLIP

[76] Inventor: Bernard J. D. Rogers, 52 Hewitt Way, Booragoon, Australia

[21] Appl. No.: 575,445

[22] Filed: Jan. 31, 1984

[30] Foreign Application Priority Data

Jan. 27, 1983 [AU] Australia ............... PF7797

[51] Int. Cl.³ ............................................. A01K 91/00
[52] U.S. Cl. ..................................... 43/43.12; 24/489
[58] Field of Search ................. 43/43.12, 4; 24/489, 24/490, 498

[56] References Cited

U.S. PATENT DOCUMENTS

| | | | |
|---|---|---|---|
| 2,170,594 | 8/1939 | Nicholson | 43/43.12 X |
| 2,959,884 | 11/1960 | LeMay | 43/43.12 |
| 3,026,646 | 3/1962 | Weaver | 43/43.12 |
| 3,357,126 | 12/1967 | Klieves | 43/43.12 |
| 3,500,575 | 3/1970 | Klemkowski | 43/43.12 X |
| 3,659,370 | 5/1972 | Ritter | 43/43.12 |
| 3,745,688 | 7/1973 | Brownlee | 43/43.12 |
| 3,959,913 | 6/1976 | Weber | 43/43.12 |
| 3,977,116 | 8/1976 | Berg | 43/43.12 |
| 4,005,510 | 2/1977 | Noda | 24/489 X |
| 4,084,299 | 4/1978 | Noda | 24/489 X |

Primary Examiner—Nicholas P. Godici
Assistant Examiner—M. Jordan
Attorney, Agent, or Firm—Harness, Dickey & Pierce

[57] ABSTRACT

A fishing line clip for holding a fishing line suitable for use with all I.G.F.A. line classes comprising a pair of identical members, each member comprising a jaw portion and a handle portion, coupled together about a transverse pivot, the jaws being held by one or more encircling O-rings and the handles diverging.

2 Claims, 4 Drawing Figures

FISHING LINE CLIP

This invention relates to a fishing line clip for use with outrigger poles.

SUMMARY OF THE INVENTION

The object of the invention is to provide a line clip which is simple in construction and operation and which is suitable for use with all I.G.F.A. line classes.

In one form the invention resides in a fishing line clip comprising a pair of identical members, each comprising a body portion or jaw with a rearwardly projecting handle portion, the two members being coupled together with the pairs in mating relationship to grip the fishing line and the handles diverging so that by squeezing the handles together the jaws can move apart, one or more elastic rings encircling the mated jaws to hold the jaws together and rope holes in the jaws to enable the clip to be fastened to an endless rope.

BRIEF DESCRIPTION OF THE DRAWING

The invention will be better understood by reference to the following description of one specific embodiment shown in the accompanying drawings wherein.

DESCRIPTION OF THE PREFERRED EMBODIMENT

Figure 1:
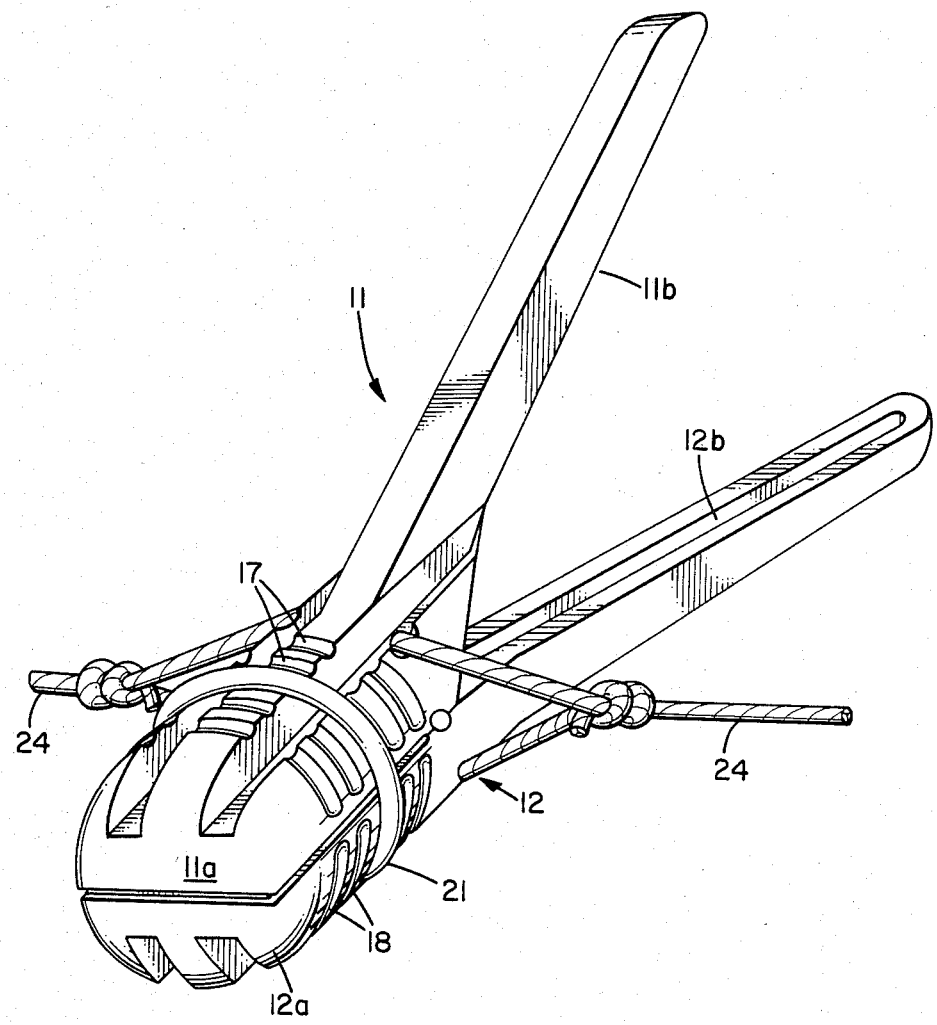
FIG. 1 is a perspective view.
Figure 3:
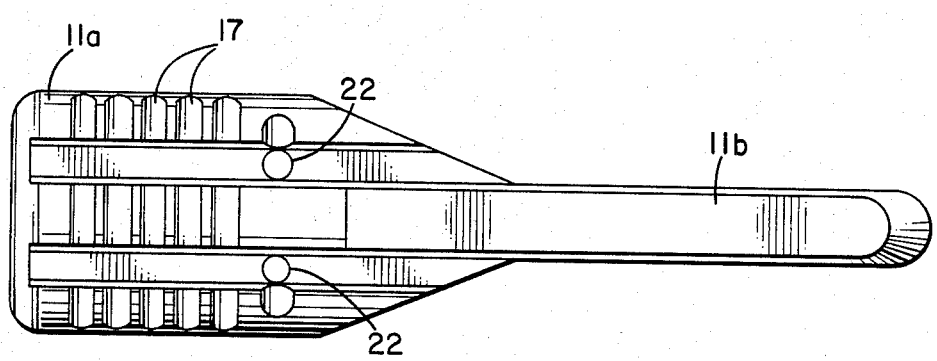
FIG. 3 is a plan view.
Figure 2:
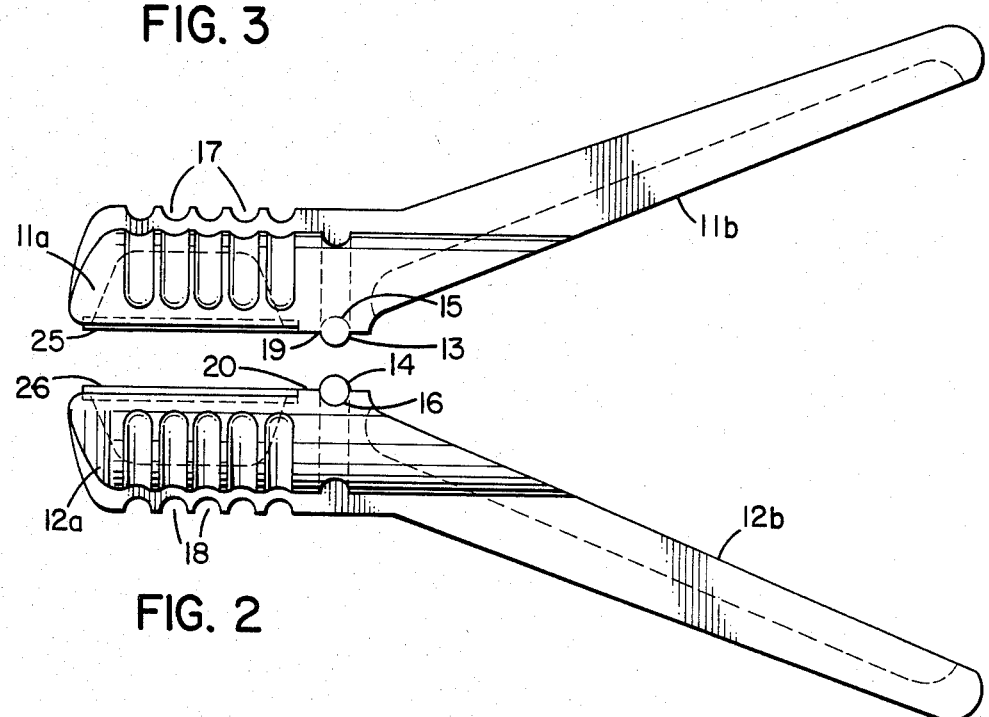
FIG. 2 is a side elevation with the two members spaced apart.
Figure 4:
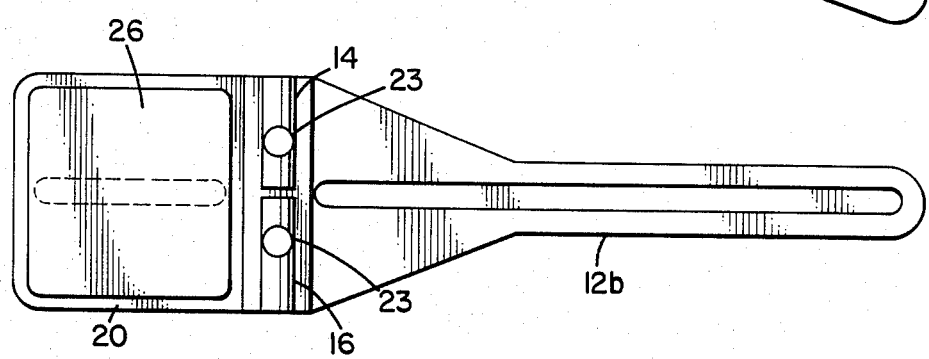
FIG. 4 is a plan view of the underside of one member.

As shown in the drawings the two members 11 and 12 are identical and are moulded from a suitable plastic. Each member comprises a body or jaw portion 11a, 12a and a rearwardly projecting handle 11b, 12b. Each member is provided with a locating peg 13, 14 which extends half way across the member and is contiguous with a similarly dimensioned locating slot 15, 16. When the pegs are located in the corresponding slots in the other member the jaws are in mating relationship and the handles 11a and 12b diverge and can be squeezed together to move the jaws 11a and 12a apart. Thus the pegs 13, 14 act as a transverse pivot pin.

Each of the jaws is provided with a series of grooves 17, 18 on the outer surface while the inner surface 19, 20 of the jaws is faced with a suitable rubber material 25, 26 to grip the fishing line. A rubber O-ring 21 is fitted around the mated jaws to hold the jaws together with the fishing line therebetween. The tension on the line may be varied by moving the O-ring towards or from the pivot point or by using additional O-rings. Each member is provided with a pair of rope holes 22, 23 which in the mating position are aligned as is best seen in FIG. 1. The clip is fastened to an endless rope 24 by passing the ends of the rope through the aligned rope holes as is shown in FIG. 1.

The fishing line is clamped between the jaws of the clip and hauled to the desired position on the outrigger pole by the endless rope. When the tension comes on the fishing line it pulls out from between the jaws.

What is claimed is:

1. A fishing line clip comprising a pair of identical members, each of said members comprising a jaw portion and a rearwardly projecting handle portion, each of said members being integrally formed with a locating peg extending transversely across a portion of the member intermediate its jaw portion and its handle portion, an adjacent slot extending transversely substantially across the remaining portion of said member formed to receive the peg of the other of said members so that when the two members are mated together with the pegs located in the corresponding slots the handle portions diverge apart and said pegs act as transverse pivot pins so that by squeezing said handle portions together said jaw portions can pivot apart, at least one elastic ring encircling the mated jaw portions to hold said jaw portions together, and rope holes in said jaw portions for enabling said clip to be fastened to an endless rope.

2. A fishing line clip as claimed in claim 1 wherein each of the jaw portions is provided on its outer surface with a series of longitudinally spaced transverse grooves to accommodate elastic rings.

* * * * *